ered Apr. 13, 1971

3,574,737
IMINOCARBAMIC ACID ESTER DERIVATIVES
Ernst Grigat, Cologne-Stammheim, and Rolf Pütter, Dusseldorf, Germany, assignors to Farbenfabriken Bayer Aktiengesellschaft, Leverkusen, Germany
No Drawing. Filed Nov. 27, 1964, Ser. No. 414,412
Claims priority, application Germany, Dec. 3, 1963, F 41,454; Jan. 16, 1964, F 41,756; Apr. 28, 1964, F 42,737
Int. Cl. A01n 9/20; C07c 119/00, 133/02
U.S. Cl. 260—554
23 Claims

ABSTRACT OF THE DISCLOSURE

Iminocarbonic and iminocarbamic acid esters of the formula

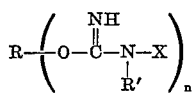

where R and $R^1$ are organo radicals, X is hydroxyl, amino, substituted amino or

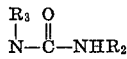

where $R_2$ and $R_3$ are organo radicals, and $n$ is an integer of 1 to 6, which esters are useful as herbicides and fungicides.

---

The present invention relates to new iminocarbonic ester derivatives or iminocarbamic acid esters and a process for the preparation of said compounds.

It has been found, in accordance with the present invention, that iminocarbonic ester derivatives or iminocarbamic acid esters are obtained if cyanic esters of the general formula $$R + OC \equiv N)_n \quad (I)$$

in which R represents an aliphatic radical substituted by electrophilic atoms or groups or an, optionally substituted, aromatic or heterocyclic radical and $n$ represents an integer from 1 to 6, are reacted at temperatures from −100 to +150° C., optionally in a solvent, with a nitrogen compound of the general formula $$R_1 - NH - X \quad (II)$$

in which $R_1$ represents hydrogen, an, optionally substituted, alkyl, aryl or heterocyclic radical, and X represents the hydroxy group, a radical of the formula

in which $R_2$ represents hydrogen, an optionally substituted, alkyl, aryl or heterocyclic radical, or both radicals $R_2$ together with the nitrogen atom, form a heterocyclic ring or form an aliphatic, araliphatic or aromatic radical bonded by a double linkage to the nitrogen atom, or X represents a radical of the formula

in which $R_1^1$ has the meaning indicated above for $R_1$ and $R_3$ represents a hydrogen atom or a lower alkyl radical, such as methyl, ethyl, n-propyl or isopropyl.

The compounds according to the present invention are new and have the general formula

in which R, $R_1$, X and $n$ have the meanings indicated above.

The nitrogen compounds, for example, hydroxylamine, hydrazones, hydrazines and semicarbazides, can also be used in the form of their inorganic of organic salts, for example sulfates, hydrochlorides, acetates, etc., i.e., whereby to form the corresponding acid addition salt.

Aliphatic radicals coming within the above definition of R include, for example, alkyl, alkenyl, cycloalkyl and cycloalkenyl radicals. Examples of electrophilic substituents for these radicals include halogen atoms and acyl, ketone, carboxylic acid, carboxylic ester, sulfonic acid, sulfonic acid ester, nitro, cyano or acetyl radicals, more especially in the α-position or β-position to the oxygen-carrying carbon atom.

As aromatic radicals coming within the above definition of R, there are to be considered both 5-membered and 6-membered aromatic hydrocarbon radicals with up to 20 carbon atoms.

Heterocyclic radicals coming within the above definition of R include, for example, 5-membered and 6-membered aromatic ring systems which contain one or more nitrogen, oxygen or sulfur atoms.

The foregoing aromatic or heterocyclic radicals can, for example, carry as substituents thereon: alkyl, aryl, alkylamino, acylamino, nitro, halogen, alkoxy, aroxy, acyloxy, carbonyl, carboxyl, carboxylic ester, carboxylic amide, sulfonyl, sulfonic acid ester, amide, acyl, cyano, thiocyanate, alkylmercapto, arylmercapto, or acylmercapto radicals, and the like.

The cyanic esters used as starting compounds can be prepared according to earlier proposals of the applicants by reacting halocyanides with compounds corresponding to the constitution required for R in the above formula and which contain hydroxyl groups, at temperatures which are advantageously below 65° C., possibly in a solvent and in the presence of a base, whereby hydrogen halide is obtained as condensation product together with the desired cyanic ester.

The following cyanic esters, for example, can be used for the process according to the invention:

phenyl cyanate;
monoalkyl and polyalkyl phenyl cyanates, such as 3-methyl, 4-isododecyl, 4-cyclohexyl, 2-tert. butyl, 3-trifluoromethyl, 2,4-dimethyl, 3,5-dimethyl, 2,6-diethyl and 4-allyl-2-methoxy-phenylcyanates;
aryl phenyl cyanates, such as 4-cyanatodiphenyl- and 4,4′-bis-cyanatodiphenyl-;
dialkylamino phenyl cyanates, such as 4-dimethylamino and 4-dimethylamino-3-methyl-phenyl cyanate;
acylamino phenyl cyanates, such as acetyl-amino-phenyl cyanate;
nitrophenyl cyanates, such as 4-nitro, 3-nitro, 4-nitro-3-methyl and 3-nitro-6-methyl-phenyl cyanate;
halophenyl cyanates, such as 2-chloro, 3-chloro, 4-chloro, 2,4-dichloro, 2,6-dichloro, 3-bromo and 2-chloro-6-methyl-phenyl cyanate;
cyanatophenyl carboxylic acids, and their esters and amides, such as 4-cyanatobenzoic acid, ethyl 2-cyanatobenzoate, 2-cyanatobenzoic acid-morpholide and -diethylamide;
cyanatophenyl sulfonic acid, and its esters and amides, such as 4-cyanatophenylsulfonic acid;
alkoxyphenyl cyanates, such as 2-methoxy, 3-methoxy and 4-isopropoxy-phenylcyanate;
phenoxyphenyl cyanates, such as 4-cyanatodiphenyl ether;
acyloxyphenyl cyanates, such as 3-acetoxyphenyl cyanate;
acylphenyl cyanates, such as 4-acetylphenyl cyanate;
cyanophenyl cyanates, such as 2,3-dicyano-1,4-dicyanatobenzene;

α- and β-naphthyl cyanates;
anthraquinyl cyanates, such as 1,4-dicyanoanthraquinone;
quinoline cyanates, such as 5-cyanatoquinoline;
cyanatopyrazoles, such as 5-cyanato-1-phenyl-3-methylpyrazole;
aryl- and alkaryl-polycyanates, such as 1,4-phenylenedicyanate, 1,5-naphthylenedicyanate, 1,3,5-tricyanatobenzene, 4,4′-bis-cyanatodiphenyl dimethyl methane, 4,4′ - bis - cyanatodiphenyl cyclo-1,1-hexane, 2,2′-bis-cyanatodinaphthyl;
alkyl mercapto aryl cyanates, such as 4-methylmercaptophenyl cyanate;
N-alkyl carbamyl aryl cyanates, such as 3-N,N-dimethylcarbamylphenyl cyanate;
and the cyanic esters of the following alcohols:
β,β,β-trichloroethanol, β,β,β-trifluoroethanol, β,β,β-tribromoethanol, acetyl acetone (enol form reacts), ethyl acetoacetate (enol form), cyclohex-1-en-1-ol-3-one, hydroxy acetone, 2-nitroethanol, β,β-dichloroethanol, hydroxyacetonitrile, ethyl hydroxyacetate; and the like.

As nitrogen compounds of the general formula $$R_1—NH—X \qquad (II')$$

it is possible to use the following compounds for the process according to the invention:

Hydrazine derivatives, possibly in the form of their salts, especially inorganic and organic salts, such as sulfates, hydrochlorides, acetates, etc., including:

alkyl or aryl hydrazines, such as methyl hydrazine, dimethyl hydrazine, isopropyl hydrazine, phenyl hydrazine, diphenyl hydrazine, 2-nitrophenyl hydrazine, 3-nitrophenyl hydrazine, 4-nitrophenyl hydrazine, 2,4-dinitrophenyl hydrazine, phenyl hydrazine-3-carboxylic acid, phenyl hydrazine-4-sulfonic acid, 2-chlorophenyl hydrazine, 2,5-dichlorophenyl hydrazine, and 2-naphthyl hydrazine-4,8-disulfonic acid;
heterocyclic hydrazines, such as 4-hydrazinopyridine, and the like;
N-aminoheterocyclic compounds, such as N-aminopiperidine, N-aminopyrrolidine, N-aminomorpholine, N-aminocarbazole and N-aminotetrahydroisoquinoline, and the like.

Hydroxylamine or hydroxylamine salts, especially inorganic and organic salts such as sulfates, hydrochlorides, acetates, furthermore hydroxyamino derivatives and their salts, e.g., phenylhydroxylamine, p-methylphenylhydroxylamine, p-chlorophenylhydroxylamine, p-methoxyphenylhydroxylamine, α-naphthylphenylhydroxylamine.

Hydrazones, such as dialkyl ketone hydrazones including acetone hydrazone, methyl ethyl ketone hydrazone, etc.:

alkyl aryl ketone hydrazones, including acetophenone hydrazone;
diaryl keto hydrazones, including benzophenone hydrazone;
alkyl aldehyde hydrazones, including propionaldehydrazone;
aralkyl aldehyde hydrazones, including benzaldehydrazone;
heterocyclic aldehyde hydrazones, including furfural hydrazone;
heterocyclic ketone hydrazones, including N-methylbenzthiazole hydrazone, etc.; and the like.

Semicarbazide derivatives, for example, also can be used for the process according to the invention, possibly in the form of their salts, such as hydrochlorides, sulfates or acetates, such as:

semicarbazide;
alkyl semicarbazides including 2-methyl-semicarbazide, 4-methyl semicarbazide, 2-ethyl semicarbazide, 4-isopropyl semicarbazide, 2,4-dimethyl semicarbazide, 4-butyl-semicarbazide; aryl semicarbazides, including 4-phenylsemicarbazide, 4-(2′,3′ or 4′-halo[i.e., chloro-, bromo-, iodo-, and fluoro-]phenyl)-semicarbazide, 4-(2′,3′ or 4′-alkylphenyl) semicarbazide, 4-(2′,3′ or 4′-nitrophenyl) semicarbazide, 4-di or polyalkylphenyl semicarbazide, 4-di or polyhalophenyl semicarbazide; mixed alkyl-aryl semicarbazides including 2-methyl-4-phenyl semicarbazide, 2-methyl-4-(2′,3′ or 4′ chlorophenyl) semicarbazides; and the like.

Solvents that may, for example, be used include inert organic solvents, such as ethers, nitriles, esters, amides including dimethylformamide, aromatic and aliphatic and possibly halogenated or nitrated hydrocarbons. Alcohols or water can, however, also be used as reaction medium. Thus, ethers such as $C_1$–$C_4$ di-lower alkyl ethers including dimethyl ether, diethyl ether, methylethyl ether, diisopropyl ether, diisobutyl ether, etc., may be used; as well as aliphatic nitriles, such as alkane nitriles, for example $C_1$–$C_4$ lower alkylcyanides, and especially acetonitrile, propionitrile, butyronitrile, etc.; esters, such as $C_1$–$C_4$ alkylalkanoyloxy esters, including methyl-, ethyl-, propyl-, butyl-, etc., esters of formic, acetic, propionic, butyric, etc., acids, and the like; amides, such as $C_1$–$C_4$ lower alkanoyl amides, including dimethyl formamide, diethyl formamide, propyl formamide, dimethyl acetamide, diethyl acetamide, propyl acetamide, ethyl propionamide, diethyl propionamide, methyl butyramide, propyl butyramide, dibutyl butyramide, etc.; aromatic hydrocarbons, such as unsubstituted, mono- and di-lower alkyl substituted, halo substituted and nitro substituted mononuclear aryl hydrocarbons, including benzene, toluene, xylene, mono- and di-chloro-, bromo-, iodo-, and fluoro-benzenes, mono- and di-nitrozenzenes, etc.; aliphatic hydrocarbons, such as $C_1$–$C_{12}$ alkanes, $C_1$–$C_{12}$ alkanes substituted with $C_1$–$C_4$ lower alkyl groups, with one or more chloro-, bromo-, iodo-, and fluoro-groups, and with one or more nitro groups, and alcohols, such as alkylols, and especially $C_1$–$C_4$ lower alkanols; and the like.

The process according to the invention is carried out at temperatures from −100° C. to +150° C., advantageously at −20° to +100° C.

The reaction can take place without catalysts, but if desired catalysts can also be used, such as, for example, basic catalysts including $C_1$–$C_4$ tri-lower alkylamines, including trimethylamine, triethylamine, tripropylamine, tributylamine, etc., pyridine, $C_1$–$C_4$ dilower alkylamines including dimethylamine, diethylamine, dipropylamine, dibutylamine, etc., alkali metal hydroxides including sodium hydroxide, potassium hydroxide, lithium hydroxide, etc., alkali metal carbonates including sodium carbonate, potassium carbonate, lithium carbonate, etc., and alkali metal alkoxides including $C_1$–$C_6$ lower alkylolates, such as sodium-, potassium-, lithium-, etc., -methoxides, -ethoxides, -propoxides, -butoxides, -amyloxides, -hexyloxides, and the like.

When carrying out the process, the components can be combined in any desired sequence, optionally in one of the solvents mentioned above. The reactants are generally used in approximately equivalent quantities, but one of the reactants can, if desired, be used in excess. Often, the products of the process precipitate spontaneously but, in other instances, they are isolated after concentration of the solvents.

The substances according to the invention show effective herbicidal properties. They can be used particularly for the destruction of weeds, especially of millet in rice-cultures. In a 0.2% solution and a total amount of 40 kg./ha. (1 ha.=10,000 m.²), both iminocarbonic acid phenylester-hydroxylamide (i.e., N-[hydroxy]-iminocarbamic acid - O - phenylester) or iminocarbonic acid-(4-methylphenyl)-ester-β-N-pentamethylene-hydrazide (i.e., N-(1-piperidino)-iminocarbamic acid - O - (4 - methyl)-phenylester) destroy and millet completely.

The substances according to the present invention also show effective fungicidal properties, and can be used particularly for combatting undesirable fungus growth. In the agar-test, iminocarbonic acid-(4-methylphenyl)- ester - 2',5' - dichlorophenyl-hydrazide (i.e., N-[N'-(2',5'-dichlorophenyl)-amino]-iminocarbamic acid-O-[4-methyl]-phenylester) in a concentration of 100 p.p.m. completely inhibited growth of fungi on the treated substrate after the sample had been inoculated with fungi from pure cultures in the form of small disks. The following fungi were used: *Corticium rolfsii, Scherotinia sclerotiorum, Thielariopsis basicola, Phytophthora cactorum*. Also, the other compounds coming within the purview of the present invention may be used for the same purposes.

The following examples are given for the purpose of illustrating the present invention. The cyanic acid esters used as starting materials are prepared according to "Chemische Berichte 97, p. 3012 (1964)."

EXAMPLE 1

13.3 g. (0.1 mol) of 4 - methylphenyl cyanate are placed in 100 ml. of ligroin. At room temperature, 6.0 g. (0.1 mol) of N,N-dimethyl hydrazine are slowly added dropwise. Stirring is continued for 30 minutes at 40° C. and the precipitated compound N-[N',N'-(dimethyl)-amino]-iminocarbamic acid - O - [4 - methyl] - phenylester

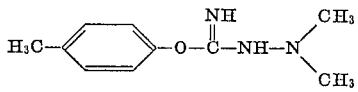

is isolated by filtering with suction. Yield: 15.5 g. (78% of the theoretical); M.P. 122–123° C.

*Analysis.*—Calculated (percent): C, 62.2; H, 7.77; N, 21.8; O, 8.29. Found (percent): C, 62.09; H, 7.99; N, 21.25; O, 8.48.

EXAMPLE 2

10.8 g. (0.1 mol) of phenylhydrazine are placed in a mixture of 70 ml. of ligroin and 40 ml. of benzene. 13.3 g. (0.1 mol) of 4 - methylphenylcyanate are slowly added. When the strongly exothermic reaction is completed, 10 g. of the compound N-[N'-(phenyl)-amino]-iminocarbamic acid-O-(4-methyl)-phenylester

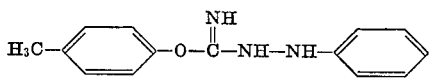

of M.P. 150–151° C., are obtained by filtering with suction. More of such product can be obtained after concentration of the filtrate.

*Analysis.*—Calculated (percent): C, 69.7; H, 6.22; N, 17.45; O, 6.65. Found (percent): C, 69.9; H, 6.47; N, 17.07; O, 6.72.

EXAMPLE 3

In a manner similar to Example 1, the compound N-(1 - morpholino)-iminocarbamic acid - O - (4 - methyl)-phenylester

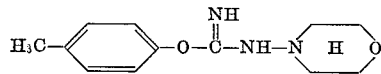

is obtained from 4 - methylphenyl cyanate and N-aminomorpholine.

*Analysis.*—Calculated (percent): C, 61.3; H, 7.24; N, 17.87; O, 7.24. Found (percent): C, 61.40; H, 7.31; N, 17.54; O, 7.31.

EXAMPLE 4

In a manner similar to Example 1, the compound N-(1 - piperidino)-iminocarbamic acid - O - (4 - methyl)-phenylester

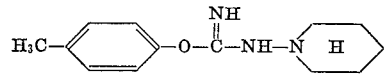

is obtained from 4 - methylphenyl cyanate and N-amino piperidine.

*Analysis.*—Calculated (percent): C, 67.0; H, 8.15; N, 18.03; O, 6.87. Found (percent): C, 66.73; H, 8.03; N, 17.84; O, 7.50.

EXAMPLE 5

In a manner similar to Example 1, the compound N-[N',N'-(dimethyl)-amino]-iminocarbamic acid - O - phenylester

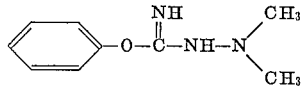

of M.P. 96–98° C. is obtained from phenyl cyanate and N,N-dimethyl hydrazine.

*Analysis.*—Calculated (percent): C, 60.3; H, 7.25; N, 23.12; O, 8.95. Found (percent): C, 60.30; H, 7.32; N, 22.91; O, 9.17.

EXAMPLE 6

In a manner similar to Example 1, the compound N-[N',N'-(dimethyl)-amino]-iminocarbamic acid-O-(β,β,β-trichloro)-ethyl ester

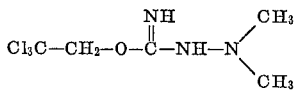

of M.P. 77–78° C. is obtained from β,β,β-trichloroethyl cyanate and N,N-dimethyl hydrazine.

*Analysis.*—Calculated (percent): C, 25.6; H, 4.8; N, 17.9; O, 6.82; Cl, 45.3. Found (percent): C, 25.96; H, 4.67; N, 17.49; O, 6.99; Cl, 45.1.

EXAMPLE 7

The reaction of 3 - chlorophenyl cyanate and N,N-dimethyl hydrazine leads to the formation of the compound N-[N',N'-(dimethyl)-amino]-iminocarbamic acid-O-(3-chloro)-phenylester

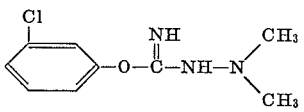

*Analysis.*—Calculated (percent): C, 50.6; H, 5.62; N, 19.7; O, 7.55; Cl, 16.7. Found (percent): C, 50.06; H, 5.73; N, 19.40; O, 7.62; Cl, 17.15.

EXAMPLE 8

10 g. (0.056 mol) of 2,5-dichlorophenylhydrazine are suspended in 100 ml. of benzene, 7.5 g. (0.056 mol) of 4-methylphenyl cyanate are added and the mixture is boiled under reflux for two hours. After evaporating the solvent and extracting the residue with hot alcohol, the product is N-[N',N'-(dimethyl)-amino]-iminocarbamic acid-O-(4-methyl)-phenylester

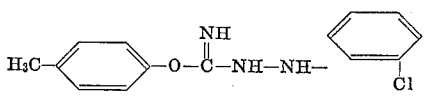

of M.P. 119–121° C.

*Analysis.*—Calculated (percent): C, 54.2; H, 4.19; N, 13.55; O, 5.17; Cl, 22.9. Found (percent): C, 53.99; H, 4.09; N, 13.86; O, 5.40; Cl, 22.9.

The infrared spectrum shows a band in the region of 6.05 to 6.15μ, characteristic for the imino group of iminocarbonic ester hydrazides.

EXAMPLE 9

8 g. (0.05 mol) of 1,4-dicyanatobenzene are slowly introduced into a solution of 6 g. (0.1 mol) of N,N-dimethyl hydrazine in 200 ml. of benzene. There is an exothermic reaction. After stirring for another 15 minutes at 80° C., the solvent is extracted. 13 g. (93% of the theoretical) of the compound p-phenylene-O,O'-bis-[N-(N',N'-[dimethyl]-amino)-iminocarbamic acid]-ester

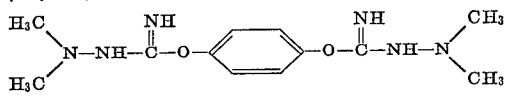

are left as a crude product. M.P. after recrystallization: 130–131° C.; infrared band at 6.05–6.15µ.

EXAMPLE 10

In a manner similar to Example 1, the reaction of 4-acetylphenyl cyanate and N,N-dimethyl hydrazine in ether as solvent, gives the compound N-[N',N'-(dimethyl)-amino]-iminocarbamic acid-O-(4-acetyl)-phenylester

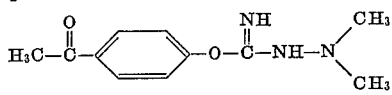

of M.P. 125–127° C.

*Analysis.*—Calculated (percent): C, 59.7; H, 6.78; N, 19.0; O, 14.5. Found (percent): C, 59.63; H, 6.88; N, 18.61; O, 14.85.

IR: Band at 6.05–6.15µ.

EXAMPLE 11

In a manner similar to Example 1, the reaction of benzyl hydrazone and 4-methylphenyl cyanate leads to the compound N - (phenyl-methylidene-imino) - iminocarbamic acid-O-(4-methyl)-phenylester

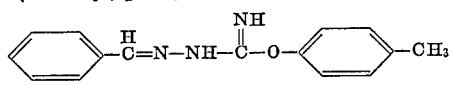

of M.P. 174–176° C. (from isopropanol).

IR: Band at 6.05–6.15µ.

EXAMPLE 12

In a manner similar to Example 1, the reaction of cyclohexanone hydrazone and 4-methylphenyl cyanate in petroleum ether as solvent leads to the compound N-(cyclo-hexylidene-imino)-iminocarbamic acid-O-(4-methyl)-phenylester

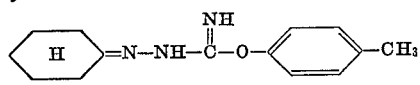

of M.P. 192–193° C.

IR: Band at 6.05–6.15µ.

EXAMPLE 13

22.5 g. (0.2 mol) of semicarbazide hydrochloride and 23.8 g. (0.2 mol) of phenyl cyanate are placed in 200 ml. of alcohol, and 20.2 g. (0.02 mol) of triethylamine are added dropwise at 30° C. After completion of the slightly exothermic reaction, stirring is continued for another 30 minutes, the alcohol is evaporated in vacuo, and the residue is triturated with ether and suction-filtered. 62 g. of residue are thus isolated. The amine hydrochloride is extracted by stirring with 150 ml. of water, the substance is again suction-filtered and, after recrystallization from water, there are obtained 29 g. (75% of the theoretical) of the compound N-(ureidoi-iminocarbamic acid-O-phenylester

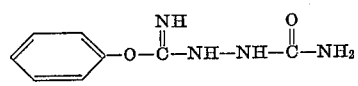

of M.P. 162° C.

*Analysis.*—Calculated (percent): C, 49.5; H, 5.16; N, 28.9; O, 16.5. Found (percent): C, 49.70; H, 5.26; N, 28.69; O, 16.89.

EXAMPLE 14

In a manner similar to Example 13, the reaction of 6.65 g. (0.05 mol) of 4-methylphenyl cyanate and 5.6 g. (0.05 mol) of semicarbazide hydrochloride, in the presence of 5.2 g. (0.05 mol) of triethylamine, provides 8.5 g. (82% of the theoretical) of the compound N-(ureido)-iminocarbamic acid-O-(4-methyl)-phenylester

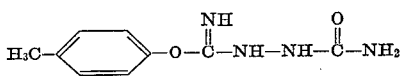

of M.P. 175–177° C. (dec.).

*Analysis.*—Calculated (percent): C, 52.0; H, 5.77; N, 26.9; O, 15.4. Found (percent): C, 51.97; H, 5.92; N, 26.80; O, 15.84.

EXAMPLE 15

8 g. (0.05 mol) of 1,4-dicyanatobenzene are placed in 50 ml. of methanol and 11.2 g. (0.1 mol) of semicarbazide hydrochloride are introduced. After adding a few drops of triethylamine, a violent reaction occurs and the temperature rises, despite cooling with ice, to 40° C. A total of 10.2 g. (0.1 mol) of triethylamine is added without any further appreciable rise in temperature. After one hour, the precipitated product is suction-filtered, washed with water and acetone, and extracted by boiling with alcohol. The yield of p-phenylene-O,O'-bis-[N-(ureido)-iminocarbamic acid]-ester

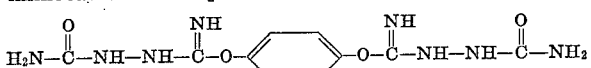

is 15 g. (97% of theory); M.P. 182–183° C. (decomposition).

*Analysis.*—Calculated (percent): C, 38.7; H, 4.52; N, 36.1; O, 20.7. Found (percent): C, 38.94; H, 4.83; N, 35.80; O, 20.78.

EXAMPLE 16

3.8 g. (0.022 mol) of 5-cyanatoquinoline are suspended in 30 ml. of methanol and 2.5 g. (0.022 mol) of semicarbazide hydrochloride are introduced. The temperature rises to 30° C. and a yellowish solution is formed which, after one hour, is carefully treated with bicarbonate until neutral. The compound N-(ureido)-iminocarbamic acid-O-quinol-5-yl ester

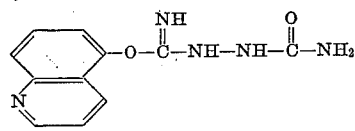

is precipitated and isolated by suction-filtration. Yield: 3.6 g. (65.5% of theory).

*Analysis.*—Calculated (percent): C, 53.9; H, 4.49; N, 28.6; O, 13.10. Found (percent): C, 63.82; H, 4,86; N, 27.91; O, 13.71.

EXAMPLE 17

8.5 g. (0.038 mol) of ethyl 5-chloro-2-cyanatobenzoate are placed in methanol and 3.5 g. (0.031 mol) of semicarbazide hydrochloride are introduced. The temperature rises and a solution is formed. In order to complete the reaction, 5.2 g. (0.051 mol) of triethylamine are added in portions. The temperature rises again and a thick paste is formed. After 1 hour, the paste is suction-filtered and washed with water and acetone. There are thus obtained 8.6 g. (64% of the theoretical) of the compound N-(ureido)-iminocarbamic acid-O - (2 - carboethoxy - 4 chloro)-phenylester

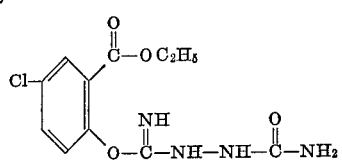

of M.P. 230–233° C. (dec.).

*Analysis.*—Calculated (percent): C, 43.9; H, 4.33; N, 18.6; Cl, 11.8. Found (percent): C, 43.63; H, 4.03; N, 18.88; O, 21.18; Cl, 12.3.

EXAMPLE 18

In a manner similar to Example 13, the reaction of 2-methoxyphenyl cyanate and semicarbazide hydrochloride leads to the compound N-(ureido)-iminocarbamic acid-O-(2-methoxy)-phenylester

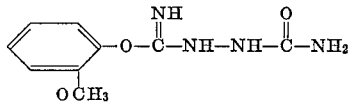

of M.P. 160–161° C. (decomposition).

*Analysis.*—Calculated (percent): C, 48.2; H, 5.36; N, 25.0; O, 21.42. Found (percent): C, 48.34; H, 5.43; N, 24.81; O, 21.84.

EXAMPLE 19

In a manner similar to Example 13, the reaction of 4-acetylphenyl cyanate and semicarbazide hydrochloride leads to the compound N-(ureido)-iminocarbamic acid-O-(4-acetyl)-phenylester

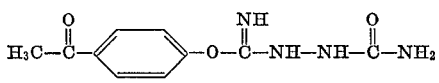

of M.P. 17–174° C. (dec.).

*Analysis.*—Calculated (percent): C, 50.8; H, 5.08; N, 23.7; O, 20.39. Found (percent): C, 60.65; H, 5.29; N, 23.08; O, 20.89.

EXAMPLE 20

In a manner similar to Example 16, the reaction of 3-chlorophenyl cyanate and semicarbazide hydrochloride, leads to the compound N-(ureido)-iminocarbamic acid-O-(3-chloro)-phenylester

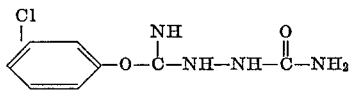

of M.P. 168–169° C. (dec.).

*Analysis.*—Calculated (percent): C, 42.1; H, 3.95; N, 24.5; O, 14.0; Cl, 15.6. Found (percent): C, 42.24; H, 4.11; N, 24.41; O, 14.48; Cl, 15.8.

EXAMPLE 21

In a manner similar to Example 16, the reaction of $\beta,\beta,\beta$-trichloroethyl cyanate and semicarbazide hydrochloride leads to the compound N-(ureido)-iminocarbamic acid-O-($\beta,\beta,\beta$-trichloro)-ethylester

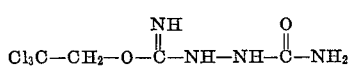

of M.P. 169–171° C. (dec.).

*Analysis.*—Calculated (percent): C, 19.25; H, 2.82; N, 22.42; O, 12.81; Cl, 42.7. Found (percent): C, 19.47; H, 2.93; N, 22.39; O, 13.00; Cl, 42.25.

EXAMPLE 22

In a manner similar to Example 16, the reaction of 3-chlorophenyl cyanate and 4-phenylsemicarbazide hydrochloride leads to the compound N-[N''-(phenyl)-ureido-N']-iminocarbamic acid-O-(3-chloro)-phenylester

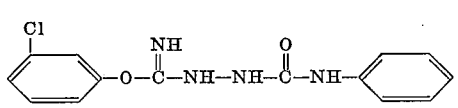

of M.P. 129–130° C.

*Analysis.*—Calculated (percent): C, 55.1; H, 4.27; N, 18.4; O, 10.5; Cl, 11.65. Found (percent): C, 54.95; H, 4.34; N, 18.56; O, 10.73; Cl, 11.3.

EXAMPLE 23

In a manner similar to Example 15, the reaction of 4-methylphenyl cyanate and 4-phenylsemicarbazide hydrochloride leads to the compound N-[N''-(phenyl)-ureido-N']-iminocarbamic acid-O-(4-methyl)-phenylester

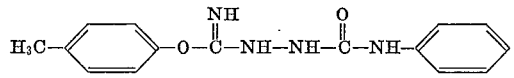

of M.P. 146–147° C.

*Analysis.*—Calculated (percent): C, 63.3; H, 5.64; N, 11.3; O, 19.7. Found (percent): C, 63.30; H, 5.79; N, 11.51; O, 19.67.

EXAMPLE 24

In a manner similar to Example 16, the reaction of $\beta,\beta,\beta$-trichlorethylcyanate and 2-methyl semicarbazide leads to the compound N-[N'-(methyl)-ureido-N']-iminocarbamic acid-O-($\beta,\beta,\beta$-trichloro)-ethyl ester

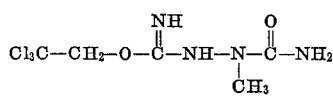

of M.P. 189–191° C.

*Analysis.*—Calculated (percent): C, 22.8; H, 3.42; N, 21.3; O, 12.2; Cl, 40.4. Found (percent): C, 23.07; H, 3.67; N, 21.36; O, 12.42; Cl, 40.5.

EXAMPLE 25

14.7 g. (0.1 mol) of 2,4-dimethylphenyl cyanate are added at 20° C. to a suspension of 7 g. (0.1 mol) of hydroxylamine hydrochloride in 50 ml. of methanol: an exothermic reaction takes place. The temperature is kept between 30° C. and 35° C. After stirring for another half hour, the methanol is evaporated in vacuo, the residue is stirred with three times its volume of ether and isolated by filtering with suction. There are thus obtained 20 g. (92% of the theoretical) of the hydrochloride of the compound N - (hydroxy) - iminocarbamic acid-O-(2,4-dimethyl)-phenylester

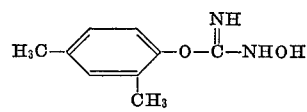

of M.P. 153° C. (dec.).

*Analysis.*—Calculated (percent): C, 49.8; H, 6.01; N, 12.9; O, 14.8; Cl, 16.4. Found (percent): C, 49.28; H, 6.02; N, 13.10; O, 14.82; Cl 16.8.

IR: strong band at $5.9\mu$ to $6.0\mu$.

By dissolving in water and precipitating with soda (NaOH), the free base of M.P. 103° C. (from benzene) can be almost quantitatively recovered.

*Analysis.*—Calculated (percent): C, 60.0; H, 6.68; N, 15.55; O, 17.8. Found (percent): C, 59.78; H, 6.88; N, 15.55; O, 18.08.

Strong band at $5.9\mu$.

EXAMPLE 26

In a manner similar to Example 25, but dissolving the hydroxylamine hydrochloride in 30 ml. of di-methyl formamide instead of suspending it in methanol, with otherwise a similar working method, there is obtained the O-(2,4-dimethylphenyl)-iminocarbonic ester hydroxylamide (i.e. N-[hydroxyl]-iminocarbamic acid-O-[2,4-dimethyl]-phenylester) M.P. 102° C. and indentical infrared spectrum to that of the product obtained from Example 25.

EXAMPLE 27

In a manner similar to Example 25, by reacting 8.4 g. (0.12 mol) of hydroxylamine hydrochloride and 19 g. (0.12 mol) of 3-chlorophenyl cyanate in benzene leads to the compound N-(hydroxy)-iminocarbamic acid-O-(3-chloro)-phenylester hydrochloride

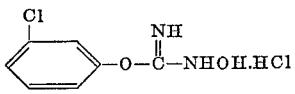

of M.P. 138° C. dec.). Yield 21 g. (=76.5% of the theoretical). IR: strong band between 5.95μ and 6.0μ.

The free base liberated with soda has the composition:

*Analysis.*—Calculated (percent): C, 45.0; H, 3.8; N, 15.0; O, 17.15; Cl, 19.1. Found (percent): C, 45.35; H, 3.91; N, 15.00; O, 16.90; Cl, 19.65.

EXAMPLE 28

In a manner similar to Example 25, the reaction of phenyl cyanate and hydroxylamine hydrochloride in ethanol as solvent, leads to the compound N-(hydroxy)-iminocarbamic acid-O-phenylester hydrochloride

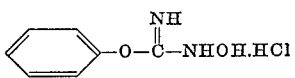

of M.P. 140° C. (with decomposition), from which, after dissolving in water and precipitating with $Na_2CO_3$ solution, there is obtained the corresponding base N-(hydroxy)-iminocarbamic acid-O-phenylester

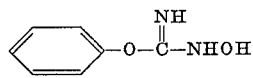

of M.P. 98°–99° C. (decomp).

*Analysis.*—Calculated (percent): C, 55.3; H, 5.27; N, 18.40; O, 21.05. Found (percent): C, 55.07; H, 5.52; N, 18.42; O, 21.30.

IR: strong band at 5.9μ.

EXAMPLE 29

If phenyl cyanate is added to a vigorously stirred aqueous solution of hydroxyl ammonium sulfate and if the pH value is adjusted to 6.5 with sodium carbonate on completing the reaction, the product is the compound N-(hydroxy)-iminocarbamic acid-O-phenylester

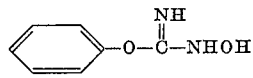

of M.P. 98° C. IR: identical with that of the product obtained in Example 28.

EXAMPLE 30

7 g. (0.1 mol) of hydroxylamine hydrochloride, suspended in 30 ml. of methanol, are added to a thoroughly stirred suspension of 8 g. (0.05 mol) of 1,4-phenylene bis-cyanate in 50 ml. of methanol at 10° C. The temperature rises and is kept at 35° C. After distilling off the solvent, the residue is saturated with acetone and dried. 12 g. (80% of the theoretical) of the dihydrochloride of the compound p-phenylene-O,O'-bis-[N-(hydroxy)-iminocarbamic acid]-ester

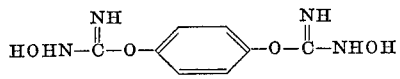

of M.P. 178–179° C. (decomp.) are left.

*Analysis.*—Calculated (percent): C, 32.1; H, 4.0; N, 18.75; O, 21.4; Cl, 23.75. Found (percent): C, 31.85; H, 4.69; N, 18.30; O, 21.95; Cl 23.9.

IR: strong band at 5.95μ to 6.0μ.

The free compound is obtained by dissolving in water and precipitating with $NaHCO_3$.

M.P 131–132° C. (decomp.).

EXAMPLE 31

In a manner similar to Example 25, the reaction of hydroxylamine hydrochloride and 4-acetylphenyl cyanate, results in the compound N-(hydroxy)-iminocarbamic acid-O-(4-acetyl)phenylester hydrochloride

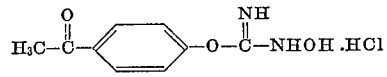

of M.P. 164–165° C. Yield 65%.

IR: apart from the C=O band of the acyl radical, there is a characteristic band at 6.0μ.

The free base (M.P. 131–132° C.) can be recovered as in Example 1.

EXAMPLE 32

In a manner similar to Example 25, the reaction of β,β,β-trichloroethyl cyanate and hydroxylamine hydrochloride, in ligroin as diluent, dissolving the oily hydrochloride and neutralizing, leads to the compound N-(hydroxy)-iminocarbamic acid-O-(β,β,β-trichloro)-ethyl ester

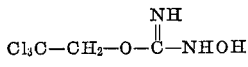

of M.P. 89° C.

IR: Characteristic band at 5.9μ–6.0μ.

EXAMPLE 33

In a manner similar to Example 25, the reaction of methyl phenyl cyanate and hydroxylamine hydrochloride leads to the compound N-(hydroxy)-iminocarbamic acid-O-(4-methyl)-phenylester hydrochloride

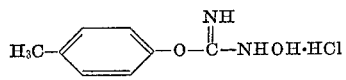

M.P. 150–151° C. (with decomposition). Yield: 87% of the theoretical. The free base can be recovered almost quantitatively with $NaHCO_3$ and water.

IR: Strong band at 6.0μ.

EXAMPLE 34

In a manner similar to Example 25, the reaction of 2-isopropylphenyl cyanate and hydroxylamine hydrochloride, leads by way of the corresponding hydrochloride to the compound N-(hydroxy)-iminocarbamic acid-O-(2-isopropyl)-phenylester

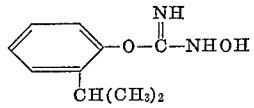

of M.P. 97° C.

*Analysis.*—Calculated (percent): C, 61.83; H, 7.27; N, 14.42; O, 16.48. Found (percent): C, 61.41; H, 7.33; N, 14.16; O, 16.76.

EXAMPLE 35

A solution of 19.1 g. (0.1 mol) of methyl 3-methyl-2-cyanatobenzoate in 50 ml. of methanol is added dropwise at room temperature to a solution of 7 g. (0.1 mol) of hydroxylamine hydrochloride in methanol. After completing the addition, stirring is continue for a short time and the methanol is evaporated in vacuo. There remains a white, crystalline residue, which is purified by washing with acetone and ether.

Yield: 24 g. (92% of the theoretical) of the compound N-(hydroxy)-iminocarbamic acid-O-(2-carbomethoxy-6-methyl)-phenylester hydrochloride

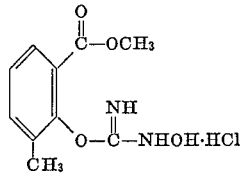

of M.P. 155° C. (decomp.).

*Analysis.*—Calculated (percent): C, 46.2; H, 4.9; N, 10.75; O, 24.6; Cl, 13.6. Found (percent): C, 45.81; H, 5.15; N, 10.28; O, 24.32; Cl, 14.1.

EXAMPLE 36

To a solution of 4.6 g. (0.033 mol) of 4-methoxyphenyl hydroxylamine in ether there are added slowly dropwise 4.9 g. (0.033 mol) 2,4-dimethyl-phenyl-cyanate dissolved in ether at a temperature of −5° C. After stirring for a further 15 minutes the separated N-(hydroxy)-N-(4'-methoxyphenyl)-iminocarbamic acid - O - (2,4-dimethyl)-phenylester

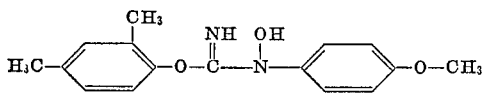

is isolated by suction, washed with ether and dried.
Yield: 8.2 g. (86% of the theoretical).
M.P. 88° C. (decomposition).
Calculated for $C_{16}H_{18}N_2O_2$ (percent): C, 67.18; H, 6.26; N, 9.78; O, 16.78. Found (percent): C, 66.81; H, 6.54; N, 9.76; O, 17.15.

EXAMPLE 37

In a manner similar to Example 36, the reaction of $\beta,\beta,\beta$-trichlorethyl cyanate and 4-methoxyphenyl hydroxylamine leads to the compound N-(hydroxy)-N-(4-methoxyphenyl)-iminocarbamic acid-O-($\beta,\beta,\beta$-trichloro)-ethyl ester

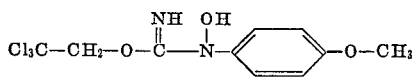

M.P. 91° C. (decomposition).
Calculated: N, 8.95%. Found: N, 9.09%.

EXAMPLE 38

In a manner similar to Example 36, the reaction of 3-chlorphenyl cyanate and 4-chlorophenylhydroxylamine leads to the compound N-(hydroxy)-N-(4'-chlorophenyl)-iminocarbamic acid-O-(3-chloro)-phenylester

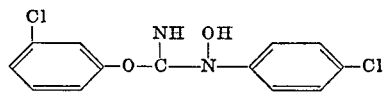

M.P. 68–69° C. (decomposition).
Calculated: N, 9.43%. Found: N, 9.41%.

EXAMPLE 39

In a manner similar to Example 16 the reaction of 3-chlorphenyl cyanate and 4-methyl semicarbazide hydrochloride leads to the compound N-[N''-(methyl)-ureido-N']-iminocarbamic acid-O-(3-chloro)-phenylester

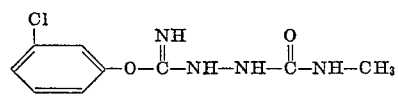

M.P. 132 to 134° C.
Analysis.—Calculated (percent): C, 44.6; H, 4.52; N, 23.1; O, 13.23; Cl, 14.6. Found (percent): C, 44.75; H, 4.64; N, 22.86; O, 13.79; Cl, 13.95.

EXAMPLE 40

Refluxing of an alcoholic solution of 2,4-dimethylphenyl cyanate and 4-n-butyl - semicarbazide - hydrochloride leads to the compound N-[N''-(butyl)-ureido-N']-iminocarbamic acid - O - (2,4-dimethyl) - phenylester hydrochloride

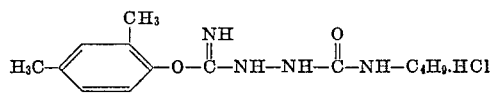

M.P. 141° C.
Analysis.—Calculated (percent): C, 53.5; H, 7.0; N, 17.8; O, 10.2; Cl, 11.3. Found (percent): C, 52.63; H, 7.33; N, 17.74; O, 10.46; Cl, 11.70.

EXAMPLE 41

Reacting of 2,4-dimethylphenyl cyanate with 4-(p-methylphenyl)-semicarbazide in an alcoholic solution at room temperature leads to the compound N-[N''-(4'-methylphenyl)-ureido-N']-iminocarbamic acid-O-(2,4-dimethyl)-phenylester

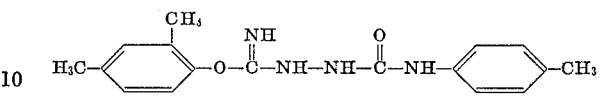

M.P. 144 to 145° C.
Analysis.—Calculated (percent): C, 65.4; H, 6.41; N, 17.95; O, 10.25. Found (percent): C, 65.05; H, 6.45; N, 18.03; O, 10.62.

EXAMPLE 42

Refluxing of a benzene solution of $\beta,\beta,\beta$-trichloroethyl cyanate and 2-phenyl-semicarbazide leads to the compound N-[N'-(phenyl)-ureido-N']-iminocarbamic acid-O-($\beta,\beta,\beta$-trichloro)-ethyl ester

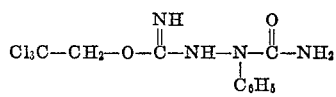

M.P. 182 to 183° C.
Analysis.—Calculated (percent): C, 37.0; H, 3.4; N, 17.2; O, 9.85. Found (percent): C, 37.69; H, 3.50; N, 17.45; O, 10.05.

EXAMPLE 43

In a manner similar to Example 36 the reaction of $\beta,\beta,\beta$-trichloroethyl cyanate and 4-methylphenylhydroxylamine leads to the compound N-(hydroxy)-N-(4-methylphenyl)-iminocarbamic acid - O - ($\beta,\beta,\beta$-trichloro)-ethyl ester

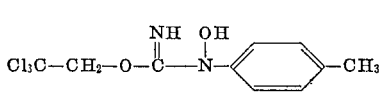

M.P. 112 to 113° C. (decomposition).
Analysis.—Calculated (percent): C, 40.4; H, 3.7; N, 9.4; O, 10.75; Cl, 35.8. Found (percent): C, 40.93; H, 3.95; N, 9.50; O, 10.70; Cl, 36.10.

EXAMPLE 44

In a manner similar to Example 36, the reaction of 2,4-dimethylphenyl cyanate and 4-methylphenyl hydroxylamine leads to the compound N-(hydroxy)-N-(4'-methylphenyl)-iminocarbamic acid-O-(2,4-dimethyl)-phenylester

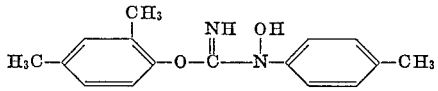

M.P. 123 to 124° C. (decomposition).
Analysis.—Calculated (percent): C, 71.1; H, 6.66; N, 10.4; O, 11.85. Found (percent): C, 70.81; H, 6.90; N, 10.37; O, 12.37.

EXAMPLE 45

To a suspension of 3.2 g. (0.02 mol) bis-cyanato-benzene-(1.4) in 60 ml. of ether 5.56 g. (0.04 mol) 4-methoxyphenyl-hydroxylamine are added in small portions at a temperature of 0° C. After standing overnight the precipitated p-phenylene-O,O'-bis-[N-(hydroxy)-N - (4'-methoxyphenyl)-iminocarbamic acid]-ester

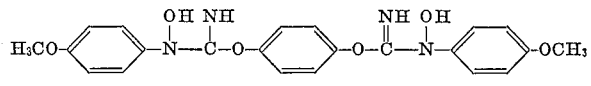

M.P. 130° C. (decomposition) is isolated by suction.
Yield: 7 g. (80% of the theoretical).
Analysis.—Calculated (percent): C, 60.2; H, 5.02; N, 12.8; O, 21.9. Found (percent): C, 60.04; H, 5.50; N, 12.96; O, 22.10.

EXAMPLE 46

In a manner similar to Example 36, the reaction of 2,4-dimethylphenyl cyanate and 4-chlorophenylhydroxylamine leads to the compound N-(hydroxy)-N-(4'-chlorophenyl)-iminocarbamic acid-O-(2,4-dimethyl) - phenylester

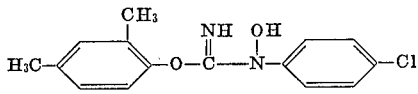

M.P. 110.5° C. (decomposition).

EXAMPLE 47

In a manner similar to Example 36, the reaction of 2,4 - dimethylphenyl cyanate and phenylhydroxylamine leads to the compound N-(hydroxy)-N-(phenyl)-iminocarbamic acid-O-(2,4-dimethyl)-phenylester

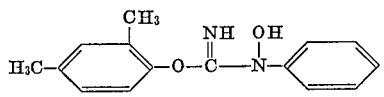

M.P. 120° C. (decomposition).

EXAMPLE 48

In a manner similar to Example 36, the reaction of 2,4-dimethylphenyl cyanate and α-naphthyl-hydroxylamine leads to the compound N-(hydroxy)-N-(α-naphthyl)-iminocarbamic acid-O-(2,4-dimethyl)phenylester

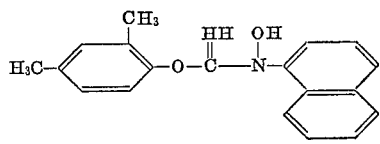

M.P. 124° C. (decomposition).

*Analysis.*—Calculated (percent): C, 74.5; H, 5.88; N, 9.15; O, 10.47. Found (percent): C, 74.53; H, 6.11; N, 9.20; O, 10.52.

EXAMPLE 49

At a temperature of 10° C. 15.3 g. (0.1 mol) 3-chlorophenyl cyanate are added slowly to a suspension of 14.5 g. (0.1 mol) phenylhydroxylamine hydrochloride in 125 ml. ether. The compound N-(hydroxy) - N - (phenyl)-iminocarbamic acid - O - (3-chloro)-phenylester hydrochloride

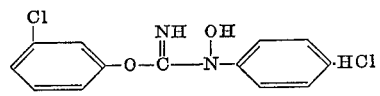

precipitates and is isolated by suction. M.P. 169° C. (decomposition). Yield: 27.4 g. (91.5% of the theoretical).

*Analysis.*—Calculated (percent): C, 52.2; H, 4.04; N, 9.36; O, 10.7; Cl, 23.7. Found (percent): C, 52.48; H, 4.39; N, 9.23; O, 10.96; Cl, 23.65

It will be appreciated that the compounds produced in each of the foregoing examples, as well as iminocarbonic acid phenyl ester - (β - phenyl - hydrazide) i.e. N - [N'-(phenyl)-amino]-iminocarbamic acid - O - phenylester, iminocarbonic acid - (β,β,β - trichloro - ethyl) - ester-[β',β' - dimethyl-hydrazide] i.e. N - [N',N' - (dimethyl)-amino] - iminocarbamic acid - O - (β,β,β-trichloro)-ethyl ester, iminocarbonic acid-(4-methylphenyl)-ester-benzalhydrazide i.e. N - (phenylmethylidene-imino) - iminocarbamic acid-O-(4-methyl)-phenylester, iminocarbonic acid phenyl ester-semicarbazide i.e. N-(ureido)-iminocarbamic acid-O-phenylester, imino-carbamic acid-(2,4-dimethylphenyl)-ester-hydroxylamide i.e., N - (hydroxy)-iminocarbamic acid - O - (2,4-dimethyl) - phenylester, and iminocarbonic acid - (4 - chlorophenyl)-ester - [3-chlorophenyl-hydroxyl]-amide i.e. N-(hydroxy) - N-(3'-chlorophenyl)iminocarbamic acid - O - (4 - chloro)-phenylester, are significantly effective as herbicides, particularly for the destruction of weeds such as those of the millet variety in rice cultures, as well as for fungicidal purposes, particularly as fungicides combating undesirable fungus growth, particularly of those fungi enumerated hereinabove.

With respect to the foregoing formulae, R may be an aliphatic radical substituted by an electrophilic group preferably in the α or β position to the cyanato oxygen atom, such electrophilic group being selected from the group consisting of halo, alkanoyl, keto, carboxylic, carboalkoxyalkyl, sulfonic acid, alkyl sulfonic acid, aryl sulfonic acid, nitro, cyano, and mixtures thereof. In particular, alkyl, cycloalkyl, alkenyl and cycloalkenyl radicals substituted by the foregoing electrophilic groups may be used, such as:

alkyl: halo lower alkyl, e.g., β,β,β-trichloro ethyl; β,β,β-tribromo ethyl; β,β,β-trifluoro ethyl; β,β-dichloro ethyl; nitro lower alkyl, e.g., β-nitroethyl; nitrilo lower alkyl, e.g., nitriolomethyl; lower alkanoyl lower alkyl, e.g., acetonyl; carbo lower alkoxy-lower alkyl, e.g., carboethoxy-methyl;

alkenyl: carbo lower alkoxy-lower alkenyl (i.e., alkylenyl R'$_2$C=CR'— wherein R' is hydrogen, alkyl, etc.), e.g., carboethoxy-β-allyl (i.e., carboethoxy α-methyl-vinyl-); acetyl-β-allyl (i.e., acetyl β-methylvinyl-);

cycloalkenyl: cycloalkyl compounds corresponding to the foregoing alkenyl type of compounds, e.g., cyclohexen (1)-ol(1)-one(3).

R of the aforesaid formulae may also be an unsubstituted or substituted aromatic radical, such as a 5-atom or 6-atom membered aromatic ring or a poly ring structure having 5 or 6 nuclear atoms per ring, with up to 20 carbon atoms being present. Among the substituents which may be present on the aromatic, and especially aryl radical are the following:

members selected from the group consisting of alkyl, aryl, alkylamino, acylamino (especially alkanoyl amino), nitro, halo, alkoxy, carbonyl (i.e., keto), carboxyl, carboxylic ester (carbo alkoxy alkyl), carboxylic amide (alkanoyl amino), sulfonyl, sulfonic acid, sulfonic acid ester (alkyl sulfonic acid, aryl sulfonic acid), amido, acyl, cyano, thiocyano, alkyl mercapto, aryl mercapto, acyl mercapto, etc. Among the aromatic radicals contemplated herein, therefore, are the following:

mononuclear aryl and mononuclear arylene, e.g., phenyl, 1,4-phenylene, 1,3,5-phenylene (i.e., 1,3,5-phen-yl-yl-yl);

lower alkyl mononuclear aryl, including both saturated and unsaturated as well as mono and poly lower alkyl substituted mononuclear aryl, e.g., 4-methylphenyl; 2,4-dimethyl phenyl; 2-iso-propylphenyl; 3-methylphenyl; 4-allyl methoxy phenyl; 4-isododecyl phenyl; 2-tert.-butylphenyl; 3,5-dimethylphenyl; 2,6-diethylphenyl;

cyclo lower alkyl mononuclear aryl, e.g., cyclohexylphenyl;

halo lower alkyl mononuclear aryl, e.g., 3-trifluoro methyl;

aryl phenyl, e.g., diphenylyl; diphenylene;

dilower alkyl amino mononuclear aryl, e.g., 4-dimethyl amino phenyl; 4-dimethyl amino-3-methylphenyl;

acyl amino mononuclear or lower alkanoyl amino mononuclear aryl, e.g., acetyl amino phenyl;

nitro mononuclear aryl, e.g., 4-nitrophenyl; 3-nitrophenyl; 4-nitro-3-methylphenyl; 3-nitro-6-methylphenyl;

halo mononuclear aryl, e.g., 2-chloro-phenyl; 3-chloro-phenyl; 4-chloro-phenyl; 2,4-dichloro-phenyl; 2,6-dichloro-phenyl; 3-bromo-phenyl; 2-chloro-6-methylphenyl;

carboxy mononuclear aryl, e.g., 4-carboxyl-phenyl;

carbo-alkoxy mononuclear aryl, e.g., 2-carbo-ethoxyphenyl; 2-carbo-methoxy-6-methylphenyl; 2-carboethoxy-4-chlorophenyl;

amino lower alkanoyl mononuclear aryl (i.e., including N-lower alkyl carbamyl mononuclear aryl), e.g., 2-carbo-morpholino phenyl; 2-carbo-diethylamino phenyl; 3-N,N-dimethyl carbamyl;

lower alkoxy mononuclear aryl, e.g., 2-methoxy phenyl; 3-methoxy phenyl, 4-methoxy phenyl, 4-iso-propoxy phenyl;

acyl mononuclear aryl (i.e., lower alkanoyl mononuclear aryl), e.g., 4-acetyl-phenyl;

aryloxy phenyl, e.g., 4-phenoxy phenyl;

acyloxy mononuclear aryl (i.e., lower alkanoyloxy mononuclear aryl), e.g., 3-acetoxy phenyl;

cyano mononuclear aryl, e.g., 2,3-dicyano-1,4-phenylene;

fused polynuclear aryl:
    fused dinuclear aryl, e.g., α-naphthyl; β-naphthyl; 1,5-naphthylyl;
    trinuclear aryl, i.e., anthraquinyl, e.g., anthraquinone-1,4-ylyl;
    tetranuclear aryl, e.g., 2,2'-bis-dinaphthyl;

lower alkyl diaryl, e.g., dimethyl-methylene-bis-4,4'-diphenyl;

cyclo lower alkyl diaryl, e.g., 1,1-cyclohexyl-bis-4,4'-diphenyl;

lower alkyl mercapto mononuclear aryl, e.g., 4-methylmercapto phenyl.

Furthermore, R of the foregoing formulae may be an unsubstituted or substituted heterocyclic radical, such as a 5-atom or 6-atom membered heterocyclic ring or polyring structure having 5 or 6 nuclear atoms per ring, etc., of the heterocyclic radical. Among the heterocyclic radicals contemplated herein, therefore, are the following:

dinuclear-N-heterocyclic, e.g., 5-quinolinyl;
mononuclear N-heterocyclic, e.g., 1-phenyl-3-methyl pyrazol-5-yl.

With regard to $R_1$ of the above formulae, it will be appreciated that the same may be hydrogen, an unsubstituted or substituted alkyl radical, an unsubstituted or substituted aryl radical, or an unsubstituted or substituted heterocyclic radical.

With respect to $R_1$, the unsubstituted or substituted alkyl radical may be of the usual type as further defined herein, including $C_1$–$C_{12}$ normal and branched alkyl chains.

As for the unsubstituted and substituted aryl radicals defined by $R_1$, these may include the usual aryl radicals such as those further defined herein, and especially the following:

halo mononuclear aryl, e.g., 4-chlorophenyl; lower alkoxy mononuclear aryl, e.g., 4-methoxy phenyl, lower alkyl mononuclear aryl, e.g., 4-methyl phenyl, fused dinuclear aryl, e.g., naphthyl.

As for the unsubstituted and substituted heterocyclic radicals defined by $R_1$, these may be the usual heterocyclic moieties as more fully defined herein.

With regard to X of the foregoing formulae, the same may be defined as hydroxyl;

wherein each $R_2$ is hydrogen, unsubstituted or substituted alkyl, unsubstituted or substituted aryl, or unsubstituted or substituted heterocyclic; N- heterocyclic in which both $R_2$ groups above taken with the nitrogen atom form a heterocyclic ring or an N-aliphatic, N-aralphatic, or N-aromatic radical bonded by a double linkage to the nitrogen atom; and a radical of the formula

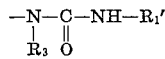

wherein $R_3$ is hydrogen or lower alkyl or phenyl and $R_1'$ is hydrogen, unsubstituted or substituted alkyl, unsubstituted or substituted aryl, or unsubstituted or substituted heterocyclic.

In particular, where X is

the following radicals are contemplated:

lower alkylamino, e.g., dimethylamino; methylamino; isopropylamino;

mononuclear amino, e.g., phenylamino; diphenylamino;

halo mononuclear arylamino, e.g., 2,5-dichloro-phenylamino; 2-chloro-phenylamino;

mononuclear aryl-N-lower alkylidene imino, e.g., phenyl formyl imino;

lower cycloalkyl-on-imino, e.g., cyclohexanon imino;
lower cycloalkyl amino, e.g., cyclopentyl amino;
nitro mononuclear aryl amino, e.g., 2-nitro-phenyl amino; 3-nitro-phenyl amino; 4-nitro-phenyl amino; 2,4-dinitro-phenyl amino;

carboxy mononuclear aryl amino, e.g., 3 carboxylic acid-phenyl amino;

sulfonic acid mononuclear aryl amino, e.g., 4-sulfonic acid-phenyl amino;

sulfonic acid dinuclear aryl amino, e.g., 4,8-disulfonic acid-naphthyl-2-amino;

heterocyclic amino, e.g., 4-pyridyl amino;
N-heterocyclo amino, e.g., N-piperidyl; N-pyrrolidino; N-morpholino; N-carbazole; tetrahydro-iso-quinolino;

alkylidene imino, e.g., acetone imino; methylethyl ketone imino;

propion alde imino; aralkylidene imino, e.g., acetophenone imino; benzophenone imino; benzalde imino;

heterocyclic aldehydo imino, e.g., furfurald imino; N-methyl benz thiazolone imino.

Where X is defined by the formula

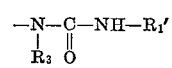

the following are contemplated:

amino carbonyl amino (i.e., urea), e.g.,

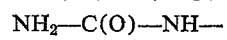

mononuclear aryl amino carbonyl amino, e.g., phenyl amino carbonyl amino;

amino carbonyl lower alkylamino, e.g., amino carbonyl methyl amino.

As regards $R_1'$ and $R_3$ of the last mentioned formula for X, such $R_1$ may be hydrogen; a lower alkyl radical such as methyl, ethyl, n-propyl, iso-propyl, etc.; a mononuclear aryl radical such as phenyl; a halo mononuclear aryl radical such as 2-chlorophenyl, 3-chlorophenyl, 4-chlorophenyl, di- or poly-halo phenyl, including chloro, bromo, iodo and fluoro substituted phenyls; lower alkyl mononuclear aryl such as 2-, 3-, or 4-lower alkyl phenyl, di- or poly-alkyl phenyl, etc.; nitromononuclear aryl such as nitrophenyl and especially 4-nitrophenyl, etc.

With respect to $R_3$, of course, this may be hydrogen or a lower alkyl radical such as methyl, ethyl, N-propyl, iso-propyl, and butyl or phenyl.

The term alkyl and/or alkyl radical as used herein, i.e., both in the specification and claims, contemplates substituted and unsubstituted normal and branched as well as saturated carbon chains, such as $C_1$–$C_{12}$ (methyl to dodecyl) alkyl chains, including especially $C_1$–$C_6$ (methyl to hexyl) lower alkyl chains. Among the substituents which may be included thereon are $C_1$–$C_6$ (methyl to hexyl) lower alkyl chains which may be normal or branched, i.e., substituted with further lower alkyl groups ($C_1$–$C_4$), as well as saturated or unsaturated carbon chains. Representative of the alkyl groups contemplated herein are, for example, methyl, ethyl, propyl, isopropyl, n-butyl, isobutyl, sec.-butyl, tert.-butyl, n-amyl, isoamyl, tert.-amyl, the hexyls, heptyls, octyls, nonyls, decyls, undecyls, dodecyls, etc., i.e. those radicals derived from the paraffin series, including methane, ethane, propane, n-butane, isobutane (2-methyl propane), n-pentane, isopentane (2-methyl butane), tert.-pentane (2,2-dimethyl propane), n-hexane, 2-methyl pentane, 3-methyl pentane, 2,2-dimethyl butane, 2,3-dimethyl butane, etc., n-heptane, 2-methyl hexane, 3-methyl hexane, 2,2-dimethyl pentane, 2,3-dimethyl pentane, 2,4-dimethyl pentane, 3,3-dimethyl pentane, 3-ethyl pentane, 2,2,3-trimethyl butane, etc., octanes, nonanes, decanes, undecanes, dodecanes, etc. In the same way, the term alkenyl and/or alkenyl radical as used herein, i.e., both in the specification and claims, contemplates similar substituted and unsubstituted normal and branched as well as ethylenically unsaturated carbon chains, such as $C_2$–$C_{12}$ (ethylene to dodecylene) alkylene chains, including especially $C_2$–$C_6$ (ethylene to hexylene) lower alkylene chains. Among the substituents which may be included thereon are $C_1$–$C_6$ (methyl to hexyl) lower alkyl chains which may be normal or branched, i.e., substituted with further lower alkyl groups ($C_1$–$C_4$), as well as saturated or unsaturated carbon chains. Representative of the alkylene groups contemplated herein are, for example, vinyl, α-allyl, β-allyl, γ-allyl, $\Delta^1$-butenyl, $\Delta^2$-butenyl, $\Delta^3$-butenyl, isobutenyl, $\Delta^1$-pentenyl, $\Delta^2$-pentenyl, $\Delta^1$-hexenyl, $\Delta^2$-hexenyl, $\Delta^3$-hexenyl, etc., the heptenyls, octenyls, nonenyls, decenyls, undecenyls, dodecenyls, etc., i.e., those radicals derived from the ethylene series, including ethylene, propylene, butene-1, butene-2, isobutylene (2-methyl propene) pentene-1 (n-amylene), pentene-2 (isoamylene, $\Delta^1$-hexylene (n-hexylene), $\Delta^2$-hexylene, $\Delta^3$-hexylene, etc., heptenes, octenes, nonenes, decenes, undecenes, dodecenes, etc.; and the like.

The term cycloalkyl and/or cycloalkyl radical as used herein, i.e., both in the specification and claims, contemplates substituted and unsubstituted as well as saturated aliphatic cyclic carbon chains, such as $C_3$–$C_8$ (cyclopropyl to cyclooctyl) chains, especially cyclo lower alkyl radicals ($C_3$–$C_6$), and including those radicals in which the replaceable hydrogen atom is located on an open alkyl chain substituent attached to a ring carbon atom of the cyclic moiety. Among the substituents which may be included on the ring are $C_1$–$C_6$ (methyl to hexyl) lower alkyl chains which may be normal or branched, i.e. substituted with further lower alkyl groups ($C_1$–$C_4$), as well as saturated or unsaturated carbon chains. Representative of the cycloalkyl groups contemplated herein are, for example, cyclopropyl, cyclobutyl, cyclopentyl, cyclohexyl, cycloheptyl, cyclooctyl, the corresponding methyl, ethyl, propyl, butyl, etc., vinyl, ally, butenyl substituted cycloalkyl radicals, such as methyl cyclopentyl, 1,2-dimethyl cyclopentyl, 1,3-dimethyl cyclopentyl, propyl cyclopentyl, ethyl cyclohexyl, butyl cyclohexyl, 1,2,4-trimethyl cyclohexyl, etc. vinyl cyclohexyl, allyl cyclohexyl, butenyl cyclohexyl, cyclohexylmethyl, β-cyclohexylethyl, etc.

The term cycloalkenyl and/or cycloalkenyl radical as used herein, i.e. both in the specification and claims, contemplates substituted and unsubstituted as well as partially unsaturated aliphatic cyclic carbon chains, such as $C_3$–$C_8$ (cyclopropenyl to cyclooctenyl) cycloalkenyl chains, especially cyclo lower alkenyl radicals ($C_3$–$C_6$), and including those radicals in which the replaceable hydrogen atom is located on an open alkyl chain substituent attached to a ring carbon atom of the cyclic moiety. Among the substituents which may be included on the ring are $C_1$–$C_6$ (methyl to hexyl) lower alkyl chains which may be normal or branched, i.e. substituted with further lower alkyl groups ($C_1$–$C_4$), as well as saturated or unsaturated carbon chains. Representative of the cycloalkenyl groups contemplated herein are, for example, cyclopropenyl, cyclobutenyl $\Delta^1$-tetramethylenyl), cyclopentenyl, cyclohexenyl, cycloheptenyl, cyclooctenyl, cyclobutenyl ($\Delta^{1,3}$-tetramethylenyl), cyclopentadienyl ($\Delta^{1,3}$-pentamethylenyl), cyclohexadienyl (including $\Delta^{3,5}$-cyclohexadienyl, $\Delta^{2(4),5}$-cyclohexadienyl, $\Delta^{2,5}$-cyclohexadienyl), cycloheptadienyl, cyclooctadienyl, the corresponding methyl, ethyl, propyl, butyl, etc., vinyl, allyl butenyl substituted cycloalkenyl radicals, such as methyl cyclopentenyl, 1,2-dimethyl cyclopentenyl, 1,3-dimethyl cyclopentenyl, propyl cyclopentenyl, ethyl cyclohexenyl, butyl cyclohexenyl, 1,2,4-trimethyl cyclohexenyl, etc., vinyl cyclohexenyl, allyl cyclohexenyl, butenyl cyclohexenyl, cyclohexenyl methyl, β-cyclohexenyl ethyl, etc.

The term aryl and/or aryl radical as used herein, i.e., both in the specification and claims, contemplates substituted as well as unsubstituted aromatic radicals, especially mononuclear, dinuclear and trinuclear aryl radicals, such as phenyl, diphenylyl, naphthyl, and anthracyl radicals including lower alkyl ($C_1$–$C_6$) substituted aryl, i.e. those radicals in which the replaceable hydrogen atom is located on a carbon atom of the aryl ring nucleus. Among the substituents which may be included on the ring nucleus are $C_1$–$C_6$ (methyl to hexyl) lower alkyl chains which may be normal or branched, i.e. substituted with further lower alkyl groups ($C_1$–$C_4$), as well as saturated or unsaturated carbon chains, and halo-, i.e. chloro-, bromo-, iodo-, and fluoro-, alkoxy, especially $C_1$–$C_6$ lower alkoxy, and nitro groups. Representative of the aryl groups contemplated herein are, for example, phenyl, methylphenyl (tolyl), ethylphenyl, n-propylphenyl, isopropylphenyl (cumenyl), n-butylphenyl, isobutylphenyl, sec. butylphenyl, tert. butylphenyl, etc., and the corresponding methyl-, ethyl-, propyl-, butyl-, etc. naphthyl radicals, vinyl phenyl, vinyl naphthyl, allylphenyl, etc., and the di- and tri- lower alkyl substituted aryl radicals, etc., as well as the corresponding halo-, alkoxy, and nitro- substituted radicals of the foregoing, such as chloro-, bromo-, iodo- and fluoro- phenyl and/or naphthyl radicals, methoxy-, ethoxy-, propoxy-phenyl and/or naphthyl radicals, and nitro-phenyl and/or nitro-naphthyl radicals.

The term aralkyl as may be used herein, and especially with regard to the aralkylidene form (e.g.

$$Y-\overset{Z}{\underset{|}{C}}=$$

wherein Y is arylalkyl and Z is hydrogen, alkyl, aryl or Y, Z and C= together are aryl-cycloalkyl=), contemplates normal and branched as well as saturated and unsaturated aryl-substituted alkyl carbon chains, such as $C_1$–$C_{12}$ (methyl to dodecyl) alkyl chains, including especially $C_1$–$C_6$ (methyl to hexyl) lower alkyl chains, containing thereon at least one aryl substituent. Among the substituents which may be included on the aralkyl radical, i.e. on either the aryl or the alkyl moiety or both, are $C_1$–$C_6$ (methyl to hexyl) lower alkyl chains which may be normal or branched, i.e. substituted with further lower alkyl groups ($C_1$–$C_4$), as well as saturated or unsaturated carbon chains. Representative of the aralkyl groups contemplated herein are, for example, benzyl, xylyl, mesityl, phenylethyl, phenyl-n-propyl, phenylisopropyl, phenyl-n-butyl, phenyl-isobutyl, phenyl-sec.-butyl, phenyl-tert.-butyl, etc., ethyl benzyl, isopropyl benzyl, ethyl phenyl ethyl, n-propylphenyl ethyl, ethylphenyl-n-propyl, diphenylmethyl, naphthylmethyl, naphthylethyl, naphthyl-n-propyl, naphthyl isopropyl, naphthyl-n-butyl, naphthylisobutyl, naphthyl - sec. - butyl, naphthyl - tert. butyl, methyl naphthylmethyl, methyl naphthylethyl, ethyl naphthylethyl, methyl naphthyl-n-propyl, methyl naphthyl isopropyl, n-propyl naphthyl methyl, isopropyl naphthyl methyl, propyl naphthyl ethyl, propyl naphthyl propyl, propyl naphthyl butyl, butyl naphthyl propyl, etc., and the di- and tri-lower alkyl substituted aralkyl radicals, etc., styryl, phenylallyl, phenyl butenyl, phenyl isobutenyl, naphthyl vinyl, naphthyl allyl, naphthyl butenyl, naphthyl isobutenyl, etc.

The term heterocyclic and/or heterocyclic radical as used herein, i.e., both in the specification and claims, contemplates substituted and unsubstituted as well as saturated and unsaturated carbon rings containing as nuclear members therein one or more hetero atoms, such as oxygen, nitrogen and sulfur. Among the substituents which may be attached to the heterocyclic ring are alkyl radicals, such as $C_1$–$C_{12}$ (methyl to dodecyl) open carbon chains and especially lower alkyl chains, such as $C_1$–$C_4$ (methyl to butyl) which may be normal or branched, i.e. substituted with further alkyl groups ($C_1$–$C_4$), as well as saturated and unsaturated. Representative of the heterocyclic groups contemplated herein are, for example, those derived from ethylene oxide, ethylene imine; trimethylene oxide, trimethylene imine, dimethyl aziethane; furan, dihydrofuran, tetrahydrofuran, furfuryl, pyrrole, pyrroline (dihydropyrrole), pyrrolidine (tetrahydropyrrole), thiopene, tetrahydrothiophene; benzofuran, dibenzofuran, benzopyrrole (indole), dibenzopyrrole (carbazole), benzothiophene, dibenzothiophene; isoxazole (1,2-azoxole), oxazole (1,3-azoxole), pyrazole (1,2-diazole), imidazole (1,3-diazole), isothiazole (1,2-azthiole), thiazole (1,3-azthiole), dihydrothiazole (thiazoline), furazan (1,2,5-oxadiazole), 1,2,3-, 1,3,4-, and 1,2,4-oxadioazoles 2,1,3-, 1,2,3-, 4,1,2-, and 1,2,4-triazoles, 1,2,5-, 1,2,3-, 1,3,4-, and 1,2,4-thiadiazoles, 1,2,3,5- and 1,2,3,4-oxatriazole, 2,1,3,4- and 1,2,3,4-tetrazole, 1,2,3,5- and 1,2,3,4-thiatriazole, pyrazoline (dihydropyrazole), pyrazolidine; indoxazine (1,2-benzisoxazole), benzoxazole, anthranil, β,γ-benzisoxazole, indiazine, benzimidazole, 1,2- and 2,1-benzisothiazole, thioanthranil, benzothiazole, benzothiazolone, n-methylbenzothiazolone, benzotriazole; 1,4 and 1,2-pyran, tetrahydropyran, pyridine, piperidine (hexahydhopyridine) thiophane, thiopyran; 1,2- and 1,4-benzopyran, dibenzopyran (xanthene), quinoline, isoquinoline, tetrahydroisoquinoline, acridine, pyrrocoline, thioxanthene; piperazine, dithiane, dioxan, 1,2,4-, 1,2,6-, 1,3,4- and 1,4,6-oxazine, morpholine, pyridazine (1,2-diazine), pyrimidine (1,3-diazine), pyrazine (1,4-diazine), 1,2-, 1,3- and 1,4-thiazine; benzoxazine, benzomorpholine (3,4-dihydro-1,4,2-benzooxazine), phenoxazine (dibenzo-1,4-oxazine), benzopyridazine, benzo(d)pyridazine (phthalazine), phenazine (dibenzo-1,4-diazine), quinazoline (benzo-1,3-diazine), 3,4-dihydroquinazoline, 1,4-benzodiazine; 1,4,2-, 1,4,3-, 1,2,5,4- and 1,2,6,4-oxadiazine, 1,3,5-, 1,2,4- and 1,2,3-triazine, the corresponding thiadiazines, 1,2,3,4-, 1,2,4,5- and 1,2,3,5-tetrazine, 3,6-, 1,2-, 2,5- and 1,6-dihydro-s-tetrazine, etc. Most especially the heterocyclic radicals contemplated herein are furyl, tetrahydrofuryl, pyranyl, tetrahydropyranyl, pyrrolo, pyrrolidino, pyridyl, piperidino, thiopheno, tetrahydrothiopheno, thiapyranyl, thiophano, morpholino, etc.

Each of the various alkyl, cycloalky, aryl, aralkyl, and heterocyclo radicals contemplates herein may be particularly substituted with at least one of the following group: halo (i.e. chloro, iodo, bromo and fluoro), nitro, amino, alkylamino, arylamino, alkylamide, alkanoyl, alkanoyloxy, cyano, sulfonic acid, keto, carboxyl, carboalkoxy, thio, mercapto, alkoxy, aryloxy and the like.

The term lower alkyl and/or lower alkyl radical as used herein, i.e. both in the specification and claims, contemplates linear and branched $C_1$–$C_6$ alkyl chains, including particular halo-substituted chains, i.e., especially chloro-substituted $C_1$–$C_6$ alkyl chains but also bromo-, iodo-, and fluoro-substituted $C_1$–$C_6$ alkyl chains, such as methyl, ethyl, n-propyl, isopropyl, n-butyl, isobutyl, sec.-butyl, tert.-butyl, n-amyl, iso-amyl, n-hexyl, etc., chloromethyl, chloroethyl, dichloroethyl, chloropropyl, etc., bromo-methyl, bromo-ethyl, iodo-methyl, iodo-ethyl, fluoro-methyl, fluoro-ethyl, etc., and the like.

The term cyclo lower alkyl (radical) and/or lower cycloalkyl (radical) as used herein, i.e. both in the specification and claims, contemplates substituted and unsubstituted alicyclic $C_3$–$C_5$ saturated rings, including lower alkyl ($C_1$–$C_4$) substituted saturated rings, such as cyclopropyl, cyclobutyl, cyclopentyl, cyclohexyl, methyl cyclohexyl, dimethyl cyclohexyl, trimethyl cyclohexyl, ethyl cyclohexyl, diethyl cyclohexyl, n-propyl cyclohexyl, isopropyl cyclohexyl, n-butyl cyclohexyl, iso-butyl cyclohexyl, sec.-butyl cyclohexyl, tert.-butyl cyclohexyl, etc.

The term phenyl and/or phenyl radical as used herein, i.e. both in the specification and claims, contemplates both substituted and unsubstituted phenyl radicals, including halogen-substituted phenyl radicals i.e., especially chloro-substituted phenyl but also bromo-, iodo-, and fluoro-substituted phenyls, lower alkyl-substituted phenyl, i.e., linear or branched $C_1$–$C_6$ alkyl-substituted phenyls, lower alkoxy-substituted phenyl, i.e., linear or branched $C_1$–$C_6$ alkoxy-substituted phenyls, and nitro-substituted phenyl, such as the phenyl radical ($C_6H_5$—), chlorophenyl, dichlorophenyl, bromophenyl, iodophenyl, fluorophenyl, and the di- and the tri-substituted corresponding halophenyls, methyl phenyl, dimethyl phenyl, trimethyl phenyl, ethyl phenyl, n-propyl phenyl, iso-propyl phenyl, n-butyl phenyl, iso-butyl phenyl, sec.-butyl phenyl, tert.-butyl phenyl, n-amyl phenyl, iso-amyl phenyl, n-hexyl phenyl, the corresponding di- and tri-substituted $C_2$–$C_6$ lower alkyl substituted phenyls, etc., methoxy phenyl, dimethoxy phenyl, trimethoxy phenyl, ethoxy phenyl, di-ethoxy phenyl, methoxy-ethoxy phenyl, n-propoxy phenyl, isopropoxy phenyl, n-butoxy phenyl, iso-butoxy phenyl, sec.-butoxy phenyl, tert.-butoxy phenyl, n-amyloxy phenyl, iso-amyloxy phenyl, n-hexyloxy phenyl, and the corresponding di-lower alkoxy substituted phenyls, etc., nitro phenyl, di-nitro phenyl, etc.

For application as fungicidal or herbicidal agents, the instant compounds can be used alone or in combination with each other, and if desired such compounds may be used in admixture with other fungicides, herbicides, insecticides and/or bactericides, for obtaining broad protection over plant crops as might be desired.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Iminocarbamic acid ester compound having the formula

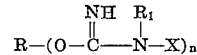

in which R is selected from the group consisting of lower alkyl substituted with one or more electrophilic groups individually selected from the group consisting of halo, lower alkanoyl, carbo-lower alkoxy, nitro and cyano; cyclohexenoneyl; phenyl; phenyl substituted with one or more substituents individually selected from the group consisting of alkyl of 1–12 carbon atoms, cyclohexyl, trifluoromethyl, lower alkoxy, lower alkenyl, phenyl, dilower alkyl amino, lower alkanoylamino, nitro, halo, carboxyl, carbo-lower alkoxy, carbo-mono and di-lower alkylamino, carbo-morpholino, sulfonic acid, lower alkanoyloxy, phenoxy, lower alkanoyl, cyano and lower alkylmercapto; diphenyl, lower alkylbisphenyl; cyclohexyl-bisphenyl; naphthyl; bisnaphthyl; and anthraquinyl; $R_1$ is selected from the group consisting of hydrogen; lower alkyl; phenyl; phenyl substituted with one or more substituents individually selected from the group consisting of halo, lower alkyl, lower alkoxy, nitro, carboxyl and sulfonic acid; naphthyl; and sulfonic acid substituted naphthyl; X is selected from the group consisting of (1) hydroxyl;
(2) a radical of the formula

in which $R_2$ is individually selected from the group consisting of hydrogen; lower alkyl; phenyl, substituted phenyl which is substituted with at least one substituent individually selected from the group consisting of halo, nitro, carboxyl and sulfonic acid; naphthyl; sulfonic acid substituted naphthyl; and (3) a radical of the formula

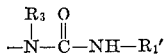

in which $R_1'$ is selected from the group consisting of hydrogen, lower alkyl, phenyl and phenyl substituted with one or more substituents selected from the group consisting of halo, lower alkyl and nitro; and $R_3$ is selected from the group consisting of hydrogen, lower alkyl and phenyl; and $n$ is an integer from 1 to 6.

2. Iminocarbamic acid ester compound according to claim 1 having the formula

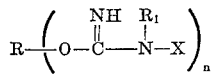

in which R is selected from the group consisting of lower alkyl substituted with one or more electrophilic groups individually selected from the group consisting of halo, lower alkanoyl, carbo-lower alkoxy, nitro and cyano; cyclohexenoneyl; phenyl; phenyl substituted with one or more substituents individually selected from the group consisting of alkyl of 1–12 carbon atoms, cyclohexyl, trifluoromethyl, lower alkoxy, lower alkenyl, phenyl, di-lower alkyl amino, lower alkanoylamino, nitro, halo, carboxyl, carbo-lower alkoxy, carbo-mono and di-lower alkylamino, sulfonic acid, lower alkanoyloxy, phenoxy, lower alkanoyl, cyano and lower alkylmercapto; diphenyl; lower alkyl-bis phenyl; cyclohexyl-bisphenyl; naphthyl; bisnaphthyl; and anthraquinyl; $R_1$ is selected from the group consisting of hydrogen; lower alkyl; phenyl; phenyl substituted with one or more substituents, individually selected from the group consisting of halo, lower alkyl, lower alkoxy, nitro, carboxyl and sulfonic acid; naphthyl; and sulfonic acid substituted naphthyl; X is a radical of the formula

in which $R_2$ is individually selected from the group consisting of hydrogen; lower alkyl; phenyl; phenyl substituted with one or more substituents individually selected from the group consisting of halo, nitro, carboxyl and sulfonic acid; naphthyl; and sulfonic acid substituted naphthyl; and $n$ is an integer from 1 to 6.

3. Iminocarbamic acid ester compound according to claim 2 having the formula

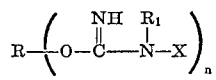

in which R is selected from the group consisting of lower alkyl substituted with one or more electrophilic groups individually selected from the group consisting of chloro, bromo, fluoro, lower alkanoyl, carbo-lower alkoxy, nitro and cyano; cyclohexenoneyl; phenyl; phenyl substituted with one or more substituents individually selected from the group consisting of lower alkyl, cyclohexyl, trifluoromethyl, lower alkoxy, lower alkenyl, phenyl, dilower alkylamino, lower alkanoylamino, nitro, chloro, bromo, carboxyl, carbo-lower alkoxy, carbo-mono and di-lower alkylamino, sulfonic acid, lower alkanoyloxy, phenoxy, lower alkanoyl, cyano and lower alkylmercapto; diphenyl; lower alkyl-bisphenyl; cyclohexyl-bisphenyl; naphthyl; bisnaphthyl; and anthraquinyl; $R_1$ is selected from the group consisting of hydrogen and lower alkyl; X is a radical of the formula

in which each $R_2$ is individually selected from the group consisting of hydrogen; lower alkyl; phenyl; phenyl substituted with one or more substituents individually selected from the group consisting of chloro, nitro, carboxyl and sulfonic acid; and sulfonic acid substituted naphthyl; and $n$ is an integer from 1 to 6.

4. Iminocarbamic acid ester compound according to claim 3 having the formula

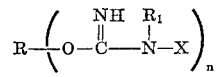

in which R is selected from the group consisting of lower alkyl substituted with one or more electrophilic groups individually selected from the group consisting of chloro, bromo and fluoro; phenyl; phenyl substituted with one or more substituents individually selected from the group consisting of lower alkyl, lower alkoxy, chloro, bromo, carbo-lower alkoxy and lower alkanoyl; $R_1$ is hydrogen; X is a radical of the formula

in which each $R_2$ is individually selected from the group consisting of hydrogen; lower alkyl; phenyl; and chloro-substituted phenyl; and $n$ is an integer from 1 to 6.

5. Iminocarbamic acid ester compound according to claim 4 having the formula

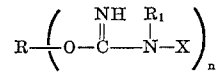

in which R is selected from the group consisting of $\beta,\beta,\beta$-trichloro-ethyl; phenyl; phenyl substituted with one or more substituents individually selected from the group consisting of chloro, carbo-lower alkoxy, lower alkyl, lower alkoxy and lower alkanoyl; $R_1$ is hydrogen; X is a radical of the formula

in which each $R_2$ is individually selected from the group consisting of hydrogen; lower alkyl; phenyl; and chloro-substituted phenyl; and $n$ is an integer from 1 to 6.

6. Compound according to claim 5 wherein R is selected from the group consisting of $\beta,\beta,\beta$-trichloro-ethyl, phenyl, chloro-substituted phenyl, lower alkyl substituted phenyl and lower alkanoyl substituted phenyl, $R_1$ is hydrogen, X is a radical of the formula

in which each $R_2$ is individually selected from the group consisting of hydrogen, lower alkyl, phenyl, and dichlorophenyl, and $n$ is 1 to 2.

7. Iminocarbamic acid ester compound according to claim 1 having the formula

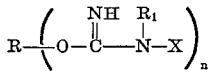

in which R is selected from the group consisting of substituted lower alkyl which is substituted with at least one electrophilic group individually selected from the group consisting of halo, lower alkanoyl, keto, carbo-lower alkoxy, nitro and cyano; cyclohexenoneyl; phenyl; substituted phenyl which is substituted with at least one substituent individually selected from the group consisting of alkyl of 1–12 carbon atoms, cyclohexyl, trifluoromethyl, lower alkoxy, lower alkenyl, phenyl, dilower alkyl amino, lower alkanoylamino, nitro, halo, carboxyl, carbo-lower alkoxy, carbo-mono and di-lower alkylamino, sulfonic acid, lower alkanoyloxy, phenoxy, lower alkanoyl, cyano and lower alkylmercapto; diphenyl; lower alkyl-bisphenyl; cyclohexyl-bisphenyl; naphthyl; bisnaphthyl; and anthraquinyl; quinolinyl; and $R_1$ is hydrogen; X is a radical of the formula

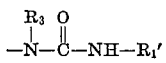

in which $R_1'$ is selected from the group consisting of hydrogen, lower alkyl, phenyl and substituted phenyl which is substituted with at least one substituent selected from the group consisting of halo, lower alkyl and nitro; $R_3$ is selected from the group consisting of hydrogen, lower alkyl and phenyl; and $n$ is an integer from 1 to 6.

8. Iminocarbamic acid ester compound according to claim 7 having the formula

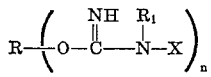

in which R is selected from the group consisting of substituted lower alkyl which is substituted with at least one electrophilic group individually selected from the group consisting of chloro, bromo, fluoro, lower alkanoyl, keto, carbo-lower alkoxy, nitro and cyano; cyclohexenoneyl; phenyl; substituted phenyl which is substituted with at least one substituent individually selected from the group consisting of lower alkyl, cyclohexyl, trifluoromethyl, lower alkoxy, lower alkenyl, phenyl, dilower alkylamino, lower alkanoylamino, nitro, chloro, bromo, carboxyl, carbo-lower alkoxy, carbo-mono and di-lower alkylamino, sulfonic acid, lower alkanoyloxy, phenoxy, lower alkanoyl, cyano and lower alkylmercapto; diphenyl; lower alkyl-bisphenyl; cyclohexyl-bisphenyl; naphthyl; bis-naphthyl; and anthraquinyl; $R_1$ is hydrogen; X is a radical of the formula

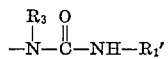

in which $R_1'$ is selected from the group consisting of hydrogen, lower alkyl, phenyl and lower alkyl substituted phenyl; $R_3$ is selected from the group consisting of hydrogen, lower alkyl and phenyl; and $n$ is an integer from 1 to 6.

9. Iminocarbamic acid ester compound according to claim 8 having the formula

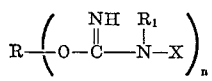

in which R is selected from the group consisting of substituted lower alkyl which is substituted with at least one electrophilic group individually selected from the group consisting of chloro, bromo and fluoro; phenyl; substituted phenyl which is substituted with at least one substituent individually selected from the group consisting of lower alkyl, lower alkoxy, chloro, bromo, carbo-lower alkoxy and lower alkanoyl; $R_1$ is hydrogen; X is a radical of the formula

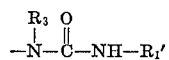

in which $R_1'$ is selected from the group consisting of hydrogen, lower alkyl, phenyl and lower alkyl substituted phenyl; $R_3$ is selected from the group consisting of hydrogen, lower alkyl and phenyl; and $n$ is an integer from 1 to 6.

10. Iminocarbamic acid ester compound according to claim 9 having the formula

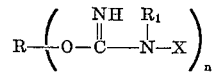

in which R is selected from the group consisting of $\beta,\beta,\beta$-trichloro-ethyl; phenyl; substituted phenyl which is substituted with at least one substituent individually selected from the group consisting of chloro, carbo-lower alkoxy, lower alkyl, lower alkoxy and lower alkanoyl; $R_1$ is hydrogen; X is a radical of the formula

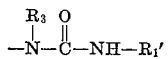

in which $R_1'$ is selected from the group consisting of hydrogen, lower alkyl, phenyl and lower alkyl substituted phenyl; $R_3$ is selected from the group consisting of hydrogen, lower alkyl and phenyl; and $n$ is an integer from 1 to 6.

11. Compound according to claim 10 wherein R is selected from the group consisting of $\beta,\beta,\beta$-trichloro-ethyl, phenyl, chloro substituted phenyl, carbo-lower alkoxy- and chloro-substituted phenyl, lower alkyl substituted phenyl, lower alkoxy substituted phenyl, lower alkanoyl substituted phenyl, $R_1$ is hydrogen, $R_1'$ is selected from the group consisting of hydrogen, lower alkyl, phenyl and lower alkyl substituted phenyl, $R_3$ is selected from the group consisting of hydrogen, lower alkyl and phenyl; and $n$ is 1 to 2.

12. Iminocarbamic acid ester compound according to claim 1 having the formula

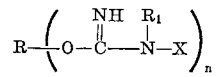

in which R is selected from the group consisting of substituted lower alkyl which is substituted with at least one electrophilic group individually selected from the group consisting of halo, lower alkanoyl, keto, carbo-lower alkoxy, nitro and cyano; cyclohexenoneyl; phenyl; substituted phenyl which is substituted with at least one substituent individually selected from the group consisting of alkyl of 1–12 carbon atoms, cyclohexyl, trifluoromethyl, lower alkoxy, lower alkenyl, phenyl, dilower alkyl amino, lower alkanoylamino, nitro, halo, carboxyl, carbo-lower alkoxy, carbo-mono and di-lower alkylamino, sulfonic acid, lower alkanoyloxy, phenoxy, lower alkanoyl, cyano and lower alkylmercapto; diphenyl; lower alkyl-bisphenyl; cyclohexyl-bisphenyl; naphthyl; bisnaphthyl; and anthraquinyl; $R_1$ is selected from the group consisting of hydrogen; lower alkyl; phenyl; substituted phenyl which is substituted with at least one substituent individually selected from the group consisting of halo, lower alkyl, lower alkoxy, nitro, carboxyl and sulfonic acid; naphthyl; sulfonic acid substituted naphthyl; X is hydroxyl; and $n$ is an integer from 1 to 6.

13. Imimocarbamic acid ester compound according to claim 12 having the formula

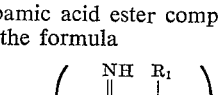

in which R is selected from the group consisting of substituted lower alkyl which is substituted with at least one electrophilic group individually selected from the group consisting of chloro, bromo, fluoro, lower alkanoyl, keto, carbo-lower alkoxy, nitro and cyano; cyclohexenoneyl; phenyl; substituted phenyl which is substituted with at least one substituent individually selected from the group consisting of lower alkyl, cyclohexyl, trifluoromethyl, lower alkoxy, lower alkenyl, phenyl, dilower alkylamino, lower alkanoylamino, nitro, chloro, bromo, carboxyl, carbo-lower alkoxy, carbo-mono and di-lower alkylamino, sulfonic acid, lower alkanoyloxy, phenoxy, lower alkanoyl, cyano and lower alkylmercapto; diphenyl; lower alkyl-bisphenyl; cyclohexyl-bisphenyl; naphthyl; bisnaphthyl;

and anthraquinyl; $R_1$ is selected from the group consisting of hydrogen; lower alkyl; phenyl; substituted phenyl which is substituted with at least one substituent individually selected from the group consisting of chloro, lower alkyl, lower alkoxy, nitro, carboxyl and sulfonic acid; naphthyl; sulfonic acid substituted naphthyl; X is hydroxyl; and $n$ is an integer from 1 to 6.

14. Iminocarbamic acid ester compound according to claim 13 having the formula

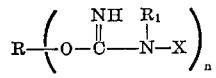

in which R is selected from the group consisting of substituted lower alkyl which is substituted with at least one electrophilic group individually selected from the group consisting of chloro, bromo and fluoro; phenyl; substituted phenyl which is substituted with at least one substituent individually selected from the group consisting of lower alkyl, lower alkoxy, chloro, bromo, carbo-lower alkoxy and lower alkanoyl; $R_1$ is selected from the group consisting of hydrogen; lower alkyl; phenyl; substituted phenyl which is substituted with at least one substituent individually selected from the group consisting of chloro, lower alkyl, lower alkoxy, nitro, carboxyl and sulfonic acid; naphthyl; sulfonic acid substituted naphthyl; X is hydroxyl; and $n$ is an integer from 1 to 6.

15. Iminocarbamic acid ester compound according to claim 14 having the formula

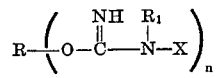

in which R is selected from the group consisting of $\beta,\beta,\beta$-trichloro-ethyl; phenyl; substituted phenyl which is substituted with at least one substituent individually selected from the group consisting of chloro, carbo-lower alkoxy, lower alkyl, lower alkoxy and lower alkanoyl; $R_1$ is selected from the group consisting of hydrogen; phenyl; substituted phenyl which is substituted with at least one substituent individually selected from the group consisting of chloro, lower alkyl and lower alkoxy; and naphthyl; X is hydroxyl; and $n$ is an integer from 1 to 6.

16. Compound according to claim 15 wherein R is selected from the group consisting of $\beta,\beta,\beta$-trichloro-ethyl, phenyl, chloro substituted phenyl, carbo-lower alkoxy-and lower alkyl-substituted phenyl, lower alkyl substituted phenyl, and lower alkanoyl substituted phenyl, $R_1$ is selected from the group consisting of hydrogen, phenyl, chloro substituted phenyl, lower alkyl substituted phenyl, lower alkoxy substituted phenyl, and naphthyl, X is hydroxyl, and $n$ is 1 to 2.

17. N-(hydroxy)-iminocarbamic acid-O-phenylester.

18. N-[N'-(2',5'-dichlorophenyl)-amino]-iminocarbamic acid-O-(4-methyl)-phenylester.

19. N-[N'-(phenyl)-amino]-iminocarbamic acid-O-phenyl ester.

20. N-[N',N'-(dimethyl)-amino]-iminocarbamic acid-O-($\beta,\beta,\beta$-trichloro)-ethyl ester.

21. N-(ureido)-iminocarbamic acid-O-phenylester.

22. N-(hydroxy)-iminocarbamic acid-O-(2,4-dimethyl)-phenylester.

23. N-(hydroxy)-N-(3'-chlorophenyl)-iminocarbamic acid-O-(4-chloro)-phenylester.

References Cited

UNITED STATES PATENTS

| | | | |
|---|---|---|---|
| 2,666,745 | 1/1954 | Mullen et al. | 260—564X |
| 3,075,013 | 1/1963 | Haldeman et al. | 260—564 |
| 3,116,326 | 12/1963 | Lamb | 260—564 |
| 3,299,081 | 1/1967 | Sletzinger et al. | 260—564X |
| 2,563,035 | 8/1951 | Gershan et al. | 260—534.5 |

OTHER REFERENCES

Henry et al., Chemical Abstracts, vol. 50, pp. 8515–8516 (1947).

Henry et al., J. Am. Chem. Soc., vol. 77, pp. 5693–5695 (1955).

Theilheimer, Method of Org. Chem., vol. II, p. 114, Interscience (1949).

Gigat et al., Chem. Ber., vol. 97, pp. 3036–3044 (1964).

FLOYD D. HIGEL, Primary Examiner

U.S. Cl. X.R.

71—94, 118, 120, 124; 260—239, 247.5, 250, 283, 288, 293, 294.7, 296, 302, 307, 308, 309.2, 310, 315, 326.86, 330.5, 345.9, 347.7, 453, 465, 465.4, 465.5, 471, 503, 509, 564; 424—322, 326

UNITED STATES PATENT OFFICE
CERTIFICATE OF CORRECTION

Patent No. 3574737   Dated April 13, 1971

Inventor(s) Ernst Grigat and Rolf Putter

It is certified that error appears in the above-identified paten and that said Letters Patent are hereby corrected as shown below:

Col. 2, line 5 (Spec. p. 2, line 17)

"of" (second occurrence) should be -- or --

Col. 4, line 31 (Spec. p. 8, line 14)

"di-nitrozenzenes" should be -- di-nitrobenzenes --

Col. 6, line 54 (Spec. p. 14, line 7)

"N-[N',N'-(dimethyl)" should be -- N-[N'-(2',5'-dichlorophenyl) -- formula"

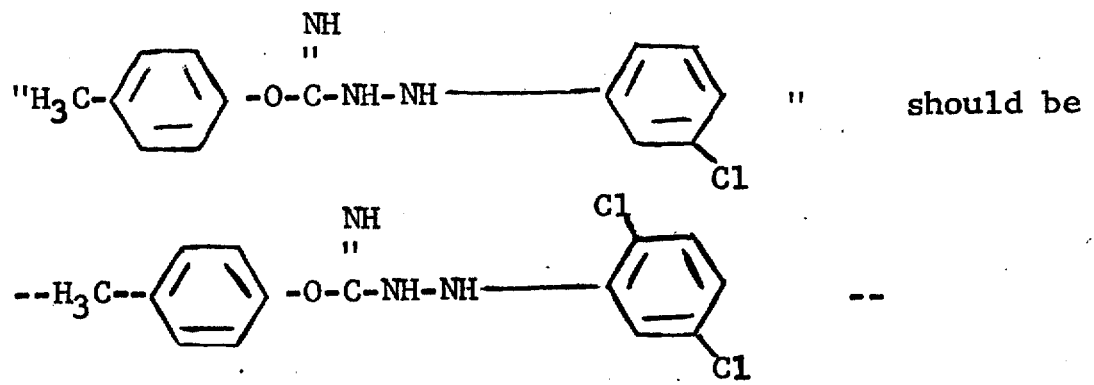

should be

Farben 1077 (Continued)

PO-1050
(5/69)

UNITED STATES PATENT OFFICE
CERTIFICATE OF CORRECTION

Patent No. __3574737__  Dated __April 13, 1971__

Inventor(s) __Ernst Grigat and Rolf Putter__   PAGE - 2

It is certified that error appears in the above-identified patent and that said Letters Patent are hereby corrected as shown below:

Col. 7, line 61 (Spec. p. 16, line 13)

"ureidoi" should be -- ureido --

Col. 8, line 49 (Spec. p. 18, line 3)

"63.82" should be -- 53.82 --

Col. 8, line 74 (Spec. p. 18, line 19)

after "18.6"   --0,21.3; -- should be inserted

Col. 9, line 24 (Spec. p. 17, line 11)

"17" should be -- 172 --

Col. 10, line 68 (Spec. p. 22, line 18)

before "m.p." -- of -- should be inserted

Signed and sealed this 14th day of September 1971.

(SEAL)
Attest:

EDWARD M. FLETCHER, JR.
Attesting Officer

ROBERT GOTTSCHALK
Acting Commissioner of Patents